(12) United States Patent
Lee

(10) Patent No.: US 9,250,321 B2
(45) Date of Patent: Feb. 2, 2016

(54) HIGH-RESOLUTION, ACTIVE REFLECTOR RADIO FREQUENCY RANGING SYSTEM

(71) Applicant: Greina Technologies, Inc., Salt Lake City, UT (US)

(72) Inventor: Daniel Joseph Lee, Salt Lake City, UT (US)

(73) Assignee: GREINA TECHNOLOGIES, INC., Salt Lake City, UT (US)

(*) Notice: Subject to any disclaimer, the term of this patent is extended or adjusted under 35 U.S.C. 154(b) by 88 days.

(21) Appl. No.: 14/265,072

(22) Filed: Apr. 29, 2014

(65) Prior Publication Data

US 2014/0232588 A1 Aug. 21, 2014

Related U.S. Application Data

(63) Continuation of application No. 13/625,335, filed on Sep. 24, 2012, now Pat. No. 8,711,032, which is a continuation of application No. 12/771,830, filed on Apr. 30, 2010, now Pat. No. 8,274,426.

(60) Provisional application No. 61/174,433, filed on Apr. 30, 2009.

(51) Int. Cl.
| | | |
|---|---|---|
| G01S 13/08 | (2006.01) | |
| G01S 13/84 | (2006.01) | |
| G01S 5/02 | (2010.01) | |

(52) U.S. Cl.
CPC .............. G01S 13/84 (2013.01); G01S 5/0289 (2013.01); *H04B 2201/70715* (2013.01)

(58) Field of Classification Search
CPC ............. G01S 13/84; G01S 5/0289; H04B 2201/70715

USPC ........... 342/125, 98, 100, 102, 103, 175, 194
See application file for complete search history.

(56) References Cited

U.S. PATENT DOCUMENTS

| 4,667,334 | A | * | 5/1987 | Collec | ................ | H03G 3/3068 |
| | | | | | | 375/365 |
| 4,907,000 | A | * | 3/1990 | Tabourier | ............. | G01S 13/586 |
| | | | | | | 342/131 |
| 5,016,019 | A | * | 5/1991 | Hawkes | ................. | G01R 25/04 |
| | | | | | | 342/400 |
| 5,220,332 | A | * | 6/1993 | Beckner | ................. | G01S 13/84 |
| | | | | | | 342/125 |
| 7,512,154 | B2 | * | 3/2009 | Quigley | ................. | H04L 1/203 |
| | | | | | | 370/468 |
| 7,633,377 | B2 | * | 12/2009 | Sadr | ..................... | G06K 7/0008 |
| | | | | | | 340/10.1 |
| 8,063,823 | B2 | * | 11/2011 | Ruelke | ................. | G01S 13/825 |
| | | | | | | 342/386 |
| 2004/0005022 | A1 | * | 1/2004 | Zhu | ..................... | H04L 27/2675 |
| | | | | | | 375/365 |
| 2005/0001720 | A1 | * | 1/2005 | Mason | ................. | G01C 21/206 |
| | | | | | | 340/539.13 |

(Continued)

*Primary Examiner* — John B Sotomayor
(74) *Attorney, Agent, or Firm* — Workman Nydegger

(57) ABSTRACT

A radio frequency ranging system is grounded in establishing and maintaining phase and frequency coherency of signals received by a slave unit from a master unit and retransmitted to the master unit by the slave unit. For a preferred embodiment of the invention, coherency is established through the use of a delta-sigma phase-lock loop, and maintained through the use, on both master and slave units, of thermally-insulated reference oscillators, which are highly stable over the short periods of time during which communications occur. A phase relationship counter is employed to keep track of the fractional time frames of the phase-lock loop as a function of the reference oscillator, thereby providing absolute phase information for an incoming burst on any channel, thereby enabling the system to almost instantaneously establish or reestablish the phase relationship of the local oscillator so that it synchronized with the reference oscillator.

20 Claims, 5 Drawing Sheets

(56) References Cited

U.S. PATENT DOCUMENTS

2007/0155408 A1* 7/2007 Belcea ............... G01S 5/0205 455/458

2009/0167513 A1* 7/2009 Hill ..................... G01S 5/0072 340/435

2010/0277360 A1* 11/2010 Lee ..................... G01S 5/0289 342/125

* cited by examiner

HIGH-RESOLUTION, ACTIVE REFLECTOR RADIO FREQUENCY RANGING SYSTEM

CROSS-REFERENCE TO RELATED APPLICATIONS

This application is a continuation of U.S. patent application Ser. No. 13/625,335, filed on Sep. 24, 2012, which is a continuation of U.S. patent application Ser. No. 12/771,830, filed on Apr. 30, 2010, which claims the benefit of U.S. Provisional Application No. 61/174,433, filed on Apr. 30, 2009, which applications are incorporated herein by reference in their entirety.

BACKGROUND OF THE INVENTION

1. The Field of the Invention

The present invention relates to active reflector radio frequency distance measuring systems and, more particularly, to systems which operate in a frequency-hopping mode, and employ both an adaptive loop for oscillator synchronization within a reflector unit in response to random phase sampling and, optionally, a phase-coherent delta sigma phase lock loop for accurate signal phase detection and creation at multiple frequencies.

2. Background and Related Art

Ranging, or the measurement of distance, through the use of phase measurements on radio frequency signals transmitted between two points in space is a well-known method of determining distance between two points. Given that simultaneous transmission and reception on the same carrier frequency is not possible because of mutual interference, transmission of radio frequency signals on path AB between stations A and B requires the use of a different carrier frequency for the return on the path BA.

Thus, such a distance measuring system requires two simultaneously occupied transmission channels and transmitters and receivers on two different frequencies. Such two frequency systems make inefficient use of the available ratio frequency spectrum. In addition, noise on either frequency may interfere with the process.

Ranging effected by measuring the phase of signals sent from point A, to point B, and back to point A is a well-established technology. For example. U.S. Pat. No. 3,243,812 to Williams discloses a system of phase measurement for determining distance. U.S. Pat. No. 4,170,773 to Fitzsimmons, et al. also discloses a method for determining distance by comparing the phase of a transmitted signal with one transponded by a distant device.

The Williams method employs the following steps: transmitting a modulated carrier at frequency $f_1$ from point A (the interrogator) to point B (the transponder); coherently recovering the modulation (called range tones) by means of a receiver at point B; impressing this modulation on another carrier of frequency $f_2$, which is then transmitted from point B to point A, where the modulation is recovered by a receiver at point A. Two versions of the range tones are then simultaneously available at point A: the original tone transmitted to point B; and the tone received from point B. The range, or distance, from point A to point B is determined by measuring the relative phase of the transmitted tones relative to the received tones and computing the distance using the following equation:

$$D = c\phi/2\omega_m - d$$

where
- D is the distance from point A to point B,
- c is the velocity of light,
- $\phi$ is the measured phase in radians,
- $\omega_m$ is the angular frequency of the modulation in radians/second,
- d is the effective distance of the delay through the transmitting and receiving hardware, and
- the integer, 2, in the denominator of the equation takes into consideration the transponded, double-distance path.

Because phase measurements are ambiguous for modulus $2\pi$, the corresponding distance will be ambiguous for modulus $c\pi/\omega_m$. However, ambiguity can be resolved by taking measurements on multiple tones at either lower frequencies or at low difference frequencies.

Such prior art systems require transmission and reception simultaneously on two different frequencies. Phase measurements are made only at the interrogator using a single phase reference source, and the interrogator and receiver hardware perform different functions. The interrogator contains the source of the signal sent around the loop from interrogator to transponder and back, as well as the measurement apparatus for determining the relative phase between the transmitted signal and the received signal. The transponder functions merely to receive the ranging signal and to retransmit it with minimum, but known, delay or delay variation.

One limitation on the use of such prior art ranging systems is the requirement for transmission and reception to occur simultaneously at both stations, thus requiring clear channel operation on two different transmit frequencies at the same time. Moreover, the range measuring circuits in such systems are started and stopped by reference marker clock signals which are transmitted from each station. The range calculation is dependent upon the reference clocks being synchronized or locked to each other, and significant range errors will be produced if the clocks are not maintained in close synchronism.

BRIEF SUMMARY OF THE INVENTION

Embodiments relate to ranging systems, including integrated ranging systems, which are capable of providing precise measurements with minimal bandwidth utilization.

Embodiments provide an active-reflector, or transponder-type radio frequency ranging system in which phase and frequency coherency between master and slave units can be precisely established during periods when measurement data is generated.

Embodiments enable discontinuous transmissions on multiple frequencies in order to optimize the use of available bandwidth, and to avoid channels which are either being used for unrelated transmissions or beset with noise.

Embodiments provide a system of vernier measurement, whereby distances are measures in terms of an integer number of wavelengths plus a fraction of a wavelength that is determined by phase angle differences between two transmissions at different frequencies.

Embodiments eliminate multi-path data from ranging calculations.

A high-resolution active reflector radio frequency ranging system includes at least two radio frequency transceivers. One of the transceivers, acting as a master unit, transmits a radio frequency signal burst to at least one other designated transceiver which acts as a slave unit and active reflector. The slave unit, actively matches the phase and frequency of the incoming signal and retransmits a signal at the matched phase and frequency. The slave can retain the phase and frequency data that it receives for some time before retransmitting the signal to the master. Within a network, master and slave designations are arbitrary, as those roles can be temporarily assigned as required. In fact, any unit that initiates a ranging operation is, by definition, a master unit. Each transceiver unit, or node, may be assigned a unique address. As the system supports a master with multiple slaves, point-to-point ranging, as well as point-to-multipoint ranging are enabled.

Operation of the high-resolution active reflector radio frequency ranging system will now be described. A first unit (the acting master) transmits a radio signal burst asking for a ranging measurement. A second unit (the acting slave) determines, either by default or by decoding a read range data packet, that it is the unit from which the acting master is requesting the ranging measurement. Following a positive determination, the acting slave measures phase and frequency drift of the incoming carrier wave and aligns the its own oscillator, or clock, so as to achieve commonality of frequency and phase coherence with the incoming signal. Accuracy of oscillator alignment within the slave unit can be enhanced by transmitting multiple packets. The slave extracts phase and frequency data from each packet and averages the results: The more packets that are received over time, the more accurate the calculation of the phase and frequency of the incoming carrier and the readjusting of the slave's internal clock.

For a preferred embodiment of the invention, an adaptive loop is employed to measure the phase of random incoming packets from the master and adjust the slave unit's oscillator so that it is phase coherent with the master unit's oscillator. As with much of the prior art, no continuous wave transmission is required. In fact, the incoming RF signal can transmit multiple packets over multiple frequencies during different periods of time. The preferred embodiment of the invention also incorporates a delta sigma phase lock loop, which maintains phase coherency of the of the slave unit's oscillator with the incoming signal, regardless of its frequency. Software onboard the slave unit is used to process incoming signal information and reconstruct it in order to maintain phase lock of the slave unit's oscillator with that of the master. This feature facilitates the implementation of frequency hopping, which is instrumental in determining measurement of absolute distances between master and slave units.

The preferred embodiment of the invention also employs thermally-insulated reference oscillators, which need be neither highly stable over time, nor highly accurate at a rated temperature. However, the thermally-insulated oscillators are very stable over short periods of time commensurate with the periods required either by the master unit to send a burst signal and receive a burst signal in response, or for a slave unit to receive, analyze, and retransmit a signal burst. A thermally-insulated quartz crystal oscillator can be fabricated by encapsulating the oscillator within an Aerogel® insulation layer. Aerogel is an ideal insulator for the application, as it has a coefficient of expansion that is virtually identical to that of quartz. Thus, in the case of a slave unit, its thermally-insulated reference oscillator is adjusted in frequency and phase to match those corresponding characteristics of the carrier wave received from the master unit, and the signal is retransmitted to the master. This process occurs over such a short period of time that any frequency drift in the thermally-insulated reference oscillator is negligible. A thermally-insulated reference oscillator (TIRO) has a huge advantage over an ovenized oscillator in terms of both cost and energy consumption. For battery powered devices, ovenized oscillators are highly impractical, as they must remain heated even when not in actual use in order to maintain stability. A 16 MHz thermally-insulated reference oscillator developed for the prototype high-resolution active reflector radio frequency ranging system has exhibited drift characteristics of less than 2.5 parts per 10 billion over a period of one second. Using this type of reference oscillator, the system is capable of ranging accuracies of better than 0.125 mm.

When the master unit transmits a radio frequency burst at a particular frequency to a slave unit, the signal is received by the slave unit, mixed with at least one local oscillator signal to create an error signal, which is fed to a digital control system consisting of a central processing unit or state machine. The output from the digital control system is fed to the reference oscillator, which controls the delta sigma phase lock loop, which in turn, controls the local oscillator. Because the individual bursts may be too short to generate an accurate determination of phase and frequency error, several bursts may be required to achieve optimum lock-on of the slave unit's reference oscillator. Thus, the TIRO retains the incoming phase and frequency information so that no matter on which channel the phase lock loop (PLL) is initially set, it derives its phase information from the reference oscillator. Thus, as the TIRO sets the phase and frequency of the PLL, the TIRO also effectively sets the frequency of the slave unit's transmitter and local oscillator.

There are two major problems associated with divide-by-integer phase lock loops. The first is that if sufficient bandwidth is allocated to the low-pass filter for a required modulation range, there is insufficient step resolution for both frequency generation and frequency modulation. The second is that if smaller frequency steps are utilized, there is insufficient band width at the low-pass filter. Fractional phase lock loops (also known as delta sigma phase lock loops) were developed to solve precisely these problems. For example, in one embodiment of the invention, the fractional PLL generates 64 clock cycle phase relations (diffs) of the local oscillator for each cycle of the 16 Mhz reference oscillator. However, when a fractional PLL is used, the wave form edges of the generated signal may not directly align with the reference oscillator. This is especially problematic in a ranging system where synchronicity of phase relationship between transmitted and received signals is essential for meaningful distance measurements. In addition, if burst-mode operation or frequency-hopping is envisioned, or if the local oscillator—for the sake of circuit simplicity and minimal power consumption—is shared between transmit and receive functions, it is essential that the phase relationship between the transmitted and the received signal be establishable at all times. The present invention employs a phase relationship counter, which keeps track of the fractional time frames of the fractional phase lock loop as a function of the reference oscillator. The phase relationship counter provides absolute phase information for an incoming burst on any channel within the broadcast/receive band, thereby enabling the system to almost instantaneously establish or reestablish the phase relationship of the local oscillator so that it synchronized with the reference oscillator. The phase relationship counter, coupled with the thermally-insulated reference oscillator that ensures synchronicity of master and slave reference oscillators with negligible drift over short periods of time, allows the system to: minimize power consumption by cutting power to all but the reference oscillator and phase-relationship counter when it is not receiving or transmitting signals; utilize a common voltage-controlled local oscillator for both receive and transmit operations; and maintain predictable phase relationships between the local oscillator and the received signal for both discontinuous bursts at the same frequency and bursts at different frequencies (frequency hopping). Frequency hopping greatly enhances the usefulness of the system, as noisy channels can be avoided and the presence of multipath transmissions can be detected and eliminated from ranging calculations. Frequency hopping can be used with any radio technology where adequate bandwidth is provided.

The radio transceivers used to implement the present invention employ quadrature phase modulation (QPM). Like all modulation schemes, QPM conveys data by changing some aspect of a carrier signal, or the carrier wave, (usually a sinusoid) in response to a data signal. In the case of QPM, the phase of the carrier is modulated to represent the data signal. Although the invention can be implemented by calculating the phase shift of incoming data packets, it can also be implemented by demodulating the phase shift of the QPM data packets and using the resulting data to calculate range.

Vernier measurement techniques can be employed to enhance the accuracy of distance calculations for the present invention. Although vernier measurement has been used in FM radar systems for at least fifty years, those systems typically relied on the simultaneous transmission to two or three signals at different frequencies. The present invention, on the other hand, is unique in that vernier measurement can be implemented using randomly-selected frequencies within randomly-selected channels, which are transmitted during randomly-selected time intervals. This is because the phase relationship counter associated with the slave unit's fractional phase lock loop allows the phase relationship of any received signal to be established as a function of the slave reference oscillator which, for relatively short periods of time, can be considered synchronous with the master reference oscillator. Vernier measurements are made in the following manner: At least two signals, which are in phase at the point of transmission, are transmitted on different frequencies. A course measurement of distance can be made by measuring the phase difference between the signals. Two frequencies suffice if they will not share a common null point over the measured distance. For two-signal measurement, the bandwidth required depends on how accurately phase difference between the two signals can be measured. If measurement accuracy is 3 degrees, then bandwidth can be 0.833 percent of a 400 MHz band, which is a 3.33 MHz-wide band, or two channels that are 3.33 MHz apart. If measurement accuracy is 1 degree, then bandwidth can be 0.277 percent, or 1.11 MHz of the same band. Vernier ranging can be easily implemented on the band specified for wireless personal area network (WPAN) in North America under IEEE specification 802.15.4-2006, as it provides for thirty channels within a bandwidth of 902-928 MHz. If resolution of the receiver is less than 1 wave length, phase of a received signal can be measured. A coarse measurement provides the number of wavelengths from the transmitter. By calculating absolute phase of the received signals, a fraction of a wavelength can then be added to the number of wavelengths from the transmitter for a more accurate calculation of range. In accordance with the present invention, it is possible to build a radio which can resolve the phase of received signals down to as little as 0.1 degree. With such a radio, phase differences between two adjacent frequencies within a narrow band can be easily resolved. In a band having a wavelength of 12 cm, theoretical resolution for ranging measurements can be better than 0.005 cm.

As previously stated, two frequencies can be used for ranging calculations up to a distance where the first null point occurs (i.e., both frequencies once again are momentarily in phase with one another. Two radio signals at different frequencies will, at some distance from the source, eventually null each other out, thereby making measurements beyond that point ambiguous. Thus, at least three frequencies are required to avoid ambiguous measurements. It is particularly helpful if the third frequency and one of the other two frequencies do not possess a divide by n relationship. Because the ranging system of the present invention utilizes a fractional phase lock loop with a phase relationship counter, random frequency hopping can be employed. When operating in the 902-928 MHz band, for example, the present invention can randomly employ any three or more of the 30 channels over time.

A major advantage of the present invention is that it addresses ranging inaccuracies caused by multipath transmissions. Although a multi-frequency ranging system works well if transmissions are made through a conductor or with a laser, a radio transmission through space generally results in reflections of the transmitted wave front, resulting in multipath transmission paths. As any path other than a straight line between the transmission and reception points is necessarily of greater distance, the signal which provides the correct phase shift for accurate ranging will be accompanied by signals that have traveled greater distances and which, therefore, display increased amounts of phase shift. The ranging systems constructed in accordance with the present invention transmit at least three radio signals at different frequencies and compare the distance-phase relationship between the different frequencies. The ranging system of the present invention utilizes a frequency-hopping approach to identify multipaths, select the shortest path, and calculate the distance of the shortest path. This is uniquely accomplished by constructing a table of measured phase and amplitude vs. frequency for at least three frequencies, which can be randomly selected in order both to avoid noisy channels and utilize only a small portion of available bandwidth at a given time. An analog-to-digital converter inputs phase-amplitude data into the table in frequency order. This data is subjected to a Fourier transform, preferably using a computer system to perform the calculations. The resulting beat-frequency peaks correspond to the various detected paths. The path having the lowest beat frequency is the shortest and actual distance between the system master and slave units. Using digital signal processing, if an inverse fourier transform is performed on the fourier transform data, the inverse fourier transform data can be used to calculate changes in the phase relationships for different frequencies, and correct for distortion caused by multiple reflective paths as the master and slave units move with respect to one another.

Vernier distance measurement and multi-path detection and correction work in concert. The process is performed using the following sequence of steps. Firstly, using frequency hopping involving at least frequencies f1, f2 and f3, phase differences between the various frequency pairs (i.e., between f1 and f2, f1 and f3, and f2 and f3) are determined. Secondly, multipath correction is performed to eliminate multipath data and determine the integer number of wavelengths at one of those frequencies that separate the master and slave unit antennas for the shortest path. Thirdly, the system switches to a phase accumulation mode and calculates the absolute phase of each received frequency, thereby providing data for calculation of a partial wavelength that must be added to the integer number of wavelengths distance for an accurate measurement. Thus, the ranging system for the present invention provides high resolution range measurements with low bandwidth utilization. Although the transmission of multiple frequencies is required for the initial distance calculation, as long as the object doesn't move more than one-half wavelength between measurement calculations, it can be tracked with a single frequency. In a gaming system, for example, the use of a single frequency between antenna pairs once position acquisition is achieved will greatly reduce computational overhead.

The uniqueness of the present invention is grounded in synchronization of the reference oscillators of the master and slave units, regardless of frequency, and in the use of thermally-insulated reference oscillators and phase-lock loops to establish and maintain phase coherency between master and slave units across all frequencies. In addition, the use of frequency hopping enables not only the random selection of low-noise channels, but also multipath data elimination, thereby provide high-resolution measurements with minimal bandwidth requirements.

DETAILED DESCRIPTION OF THE PREFERRED EMBODIMENTS

The present invention provides a system for low-cost radio frequency ranging that is grounded in establishing and maintaining phase and frequency coherency of signals received by a slave unit from a master unit and retransmitted to the master unit by the slave unit. Phase and frequency coherency is established through the use of a phase-lock loop, and maintained through the use, on both master and slave units, of thermally-insulated reference oscillators, which are highly stable over the short periods of time during which communications occur between a master unit and a slave unit. For preferred embodiments of the present invention, fractional phase-lock loops (also known as delta sigma phase-lock loops having a dithered divide ratio) are employed in order to provide both sufficient bandwidth at the low-pass filter, as well as adequate step resolution for both frequency generation and frequency modulation. In order to keep track of the fractional time frames of the fractional phase-lock loop as a function of the reference oscillator, a phase relationship counter is employed. The phase relationship counter provides absolute phase information for an incoming burst on any channel within the broadcast/receive band, thereby enabling the system to almost instantaneously establish or reestablish the phase relationship of the local oscillator so that it synchronized with the reference oscillator. The system lends itself to frequency hopping operation, which permits random selection of low-noise channels, as well as the elimination of multipath data, thereby providing high-resolution measurements with minimal bandwidth requirements.

The invention will now be described with reference to the attached drawing figures, which include sufficient detail so that those having ordinary skill in the art will be able to recreate the various embodiments thereof.

Figure 1:
FIG. 1 is a block diagram of a first implementation of the radio frequency ranging system of the present invention showing a single master transceiver interacting with a single slave transceiver.
Figure 2:
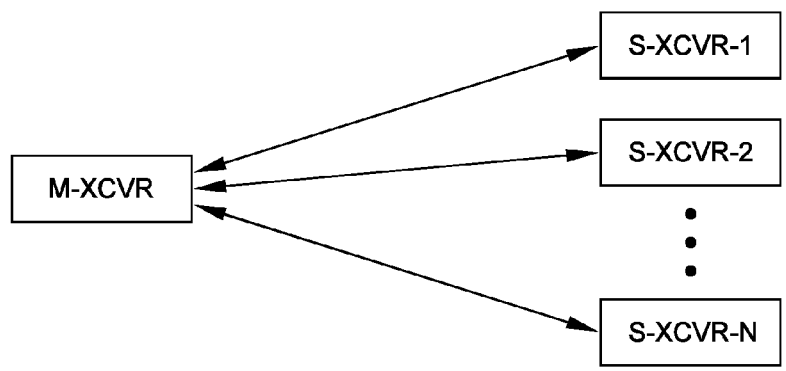
FIG. 2 is a block diagram of a second implementation of the radio frequency ranging system of the present invention showing a single master transceiver interacting with multiple slave transceivers.

Referring now to FIG. 1, a first implementation of the radio frequency ranging system 100 employs a single master transceiver M-XCVR, which interacts with a single slave transceiver S-XCVR;

Referring now to FIG. 2, a second implementation of the radio frequency ranging system 200 employs a single master transceiver M-XCVR1, which interacts with multiple slave transceivers S-XCVR-1, S-XCVR-2, . . . S-XCVR-N.

Figure 3:
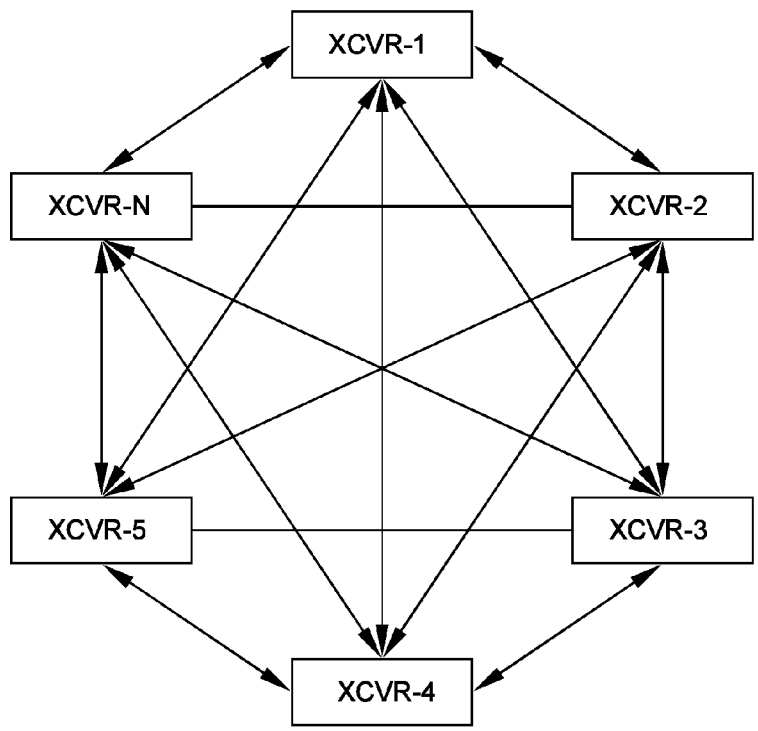
FIG. 3 is a block diagram of a third implementation of the radio frequency ranging system of the present invention showing multiple master/slave transceivers interacting with each other.

Referring now to FIG. 3, a third implementation of the radio frequency ranging system 300 employs multiple master/slave transceivers XCVR-1, XCVR-2, XCVR-3, XCVR-4, XCVR-5, . . . XCVR-N, which interact with each other.

Figure 4:
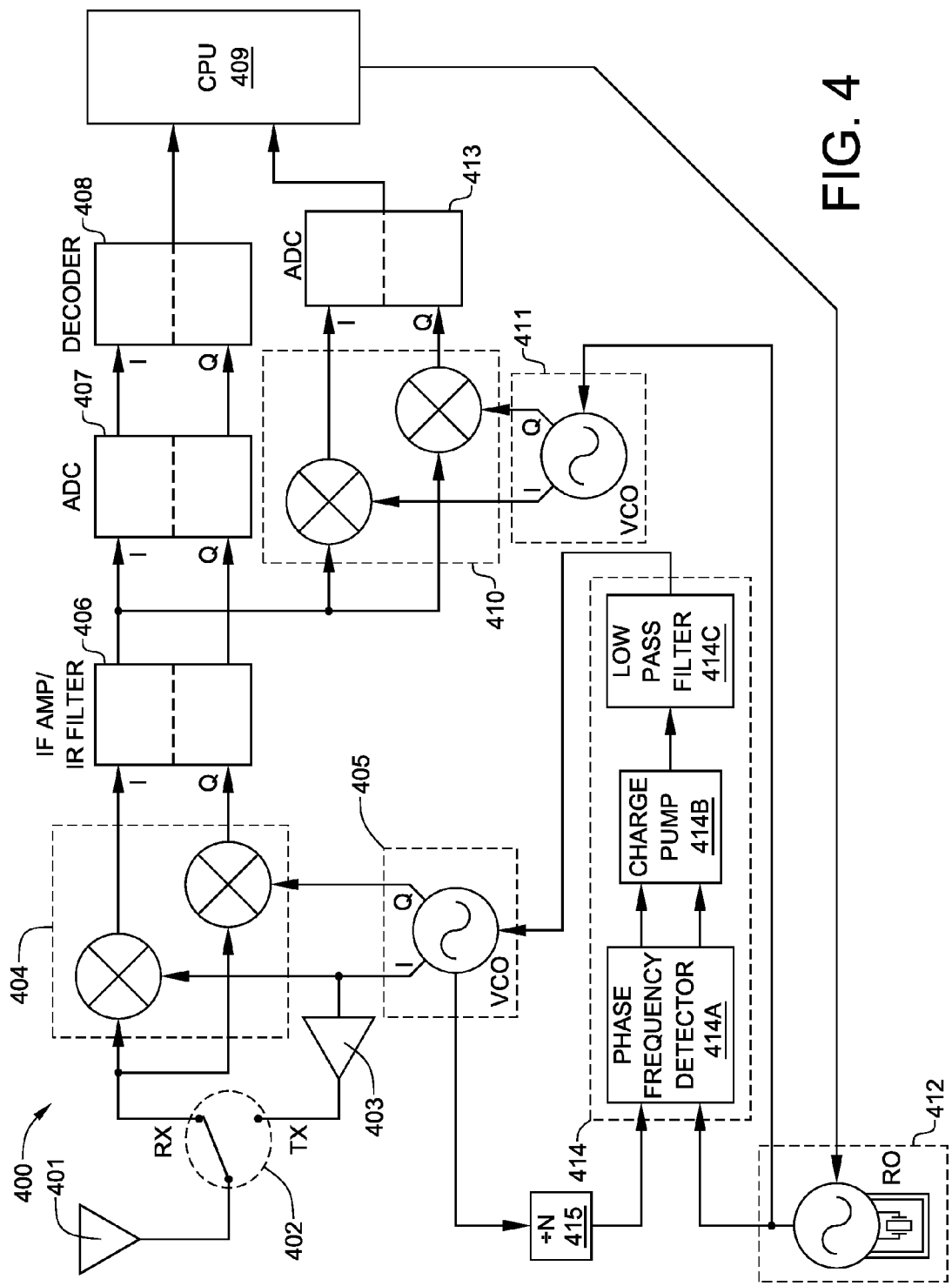
FIG. 4 is a block diagram of a first embodiment superheterodyne transceiver having a thermally-insulated reference oscillator and a divide-by-n phase lock loop for achieving frequency and phase coherency of the reference oscillator with a received radio signal.

Referring now to FIG. 4, a first embodiment superheterodyne transceiver 400 incorporates quadrature architecture (both I and Q signals) for digital transmission and reception and a divide-by-n phase lock loop, where n is an integer. An antenna 401 is used for both receive and transmit functions. An RF switch 402 switches between receive (RX) and transmit (TX) modes. A transmission signal driver 403 feeds the TX pole of RF switch 402. In the receive path, a front-end image rejection mixer stage 404 generates an intermediate frequency for both I and Q signals by mixing them with inputs from a primary voltage-controlled oscillator (VCO) 405. The intermediate frequency I and Q signals are fed to an intermediate frequency image-reject filter and amplifier stage 406, then to an analog-to-digital converter stage 407, then to a quadrature phase decoder stage 408. The decoded digital signal is then fed to a CPU 409. After leaving the intermediate frequency filter and amplifier stage 406, the I and Q signals are also fed to a secondary image rejection mixer stage 410, which performs a secondary pass on the received data in order to optimize it for ranging calculations. Mixer stage 410 mixes the I and Q signals with inputs from a secondary voltage-controlled oscillator 411. The secondary voltage-controlled oscillator 411 is synchronized to a reference oscillator 412. A secondary phase lock loop (not shown) maintains the lock of the secondary VCO 411 on the reference oscillator 412. After being passed through a low-pass filter (not shown), the I and Q signals are converted to DC signals, which are fed into a two-channel A-to-D converter 413. The resultant digital signals are fed into the CPU 409. As the primary VCO 405 is used for both transmit and receive functions, the circuitry must be phase and frequency coherent between transmit and receive. The signal from the primary VCO 405 is fed to a divide-by-n prescaler 415, and then to a phase lock loop block 414, which consists of a phase detector 414A, a charge pump 414B and a low pass filter 414C. The function of the divide-by-n prescaler 415 is to convert the selected transmit or receive frequency to the frequency of the reference oscillator 412. The output from the phase lock loop block 414 is fed into the primary VCO 405, thereby forming the loop. If the first embodiment transceiver 400 is operating is a slave mode, the CPU 409 can calculate the phase difference of an incoming signal and, using a PLL-type algorithm, lock the reference oscillator (RO) 412 on the incoming signal. The primary VCO is also locked on to RO 412 via the divide-by-n prescaler 415 and phase lock loop block 414, so that all blocks of the transceiver 400 are phase and frequency coherent. In the master mode, the CPU simply reads data out of block 6 (the I and Q), turn that into a phase info and use that in ranging algorithm without adjusting the RO. If the first embodiment transceiver 400 is operating in a transmit, or master, mode, the frequency of primary VCO 405 is shifted to the primary transmission frequency by adjusting the divide-by-n factor in the divide-by-in prescaler 415. As the primary VCO 405 locks onto the reference oscillator 412 by means of the phase lock loop block 414, an output signal is generated that is frequency and phase coherent with the RO 412.

As heretofore explained in the Summary section, there are two major problems associated with divide-by-integer phase lock loops. The first is that if sufficient bandwidth is allocated to the low-pass filter for a required modulation range, there is insufficient step resolution for both frequency generation and frequency modulation. The second is that if smaller frequency steps are utilized, there is insufficient band width at the low-pass filter. Although use of a fractional phase lock loop solves the problems of insufficient step resolution and low-pass filter bandwidth, it creates an additional problem that waveform edges of the generated signals may not directly align with the reference oscillator 412. This is especially problematic in a ranging system where synchronicity of phase relationship between transmitted and received signals is essential for meaningful distance measurements. The superheterodyne transceivers of FIGS. 5, 6 and 7 address the problem of waveform misalignment in three different ways Referring now to FIG. 5, a second embodiment superheterodyne transceiver 500 employs a dithered divide prescaler 501 for implementing a standard delta-sigma-modulated phase lock loop block 414. The phase lock loop block 414 includes a phase frequency detector 414A, a charge pump 414B, and a low pass filter 414C. The output from the phase lock loop block 414 is received by the primary voltage-controlled oscillator 405. Although, as is true for all phase-lock loops employing dithered divide prescalers, the waveform edges of signals generated for the multiple frequencies corresponding to the various channels within the transceiver's transmit/receive band are usually misaligned with the reference oscillator 412, all channel frequencies within that band will, in fact, be aligned with the reference oscillator 412 on a periodic basis. This particular phenomenon of periodic alignment provides the key to the establishment or reestablishment of phase synchronization between the reference oscillator 412 and the local voltage-controlled oscillators 405 and 411 for this embodiment of the invention. The length of the period between conditions of alignment is determined by the fractional value 504 that is input as the X value for the X+Y accumulator 505. A sum of X and Y values is provided as a recurring Y input to accumulator 505 via an accumulate path 506 on each cycle of the reference oscillator 412. Whenever the accumulator 505 overflows, an overflow signal is sent to the divide prescaler 501 via path 507. The dithered divide ratio generated by the divide prescaler 501 is determined by the frequency of overflow signals from path 507. A phase relationship counter 502 is provided that keeps track of clock cycle counts emanating from the reference oscillator 412. The counter 502 is set so that it overflows at the precise time when all dithered frequencies are in phase with the reference oscillator 412. The overflow signal from the phase relationship counter 502 is sent to a latch 503, which triggers changes in frequency of the voltage-controlled oscillators 405 and 411 at precisely the time when all dithered frequencies are in phase. Alternatively, the overflow signal from the phase relationship counter 502 can be programmed to trigger the latch 503 at a time when all channel frequencies have a predictable phase relationship other than alignment. There are two principal advantages of this second embodiment superheterodyne transceiver 500: the channel selection circuitry is simple, inexpensive, and operates with minimal power consumption. A disadvantage of this embodiment is that channel switching can be slow. The greater the number of channels in the transmit/receive band, the slower the switching speed. It will be noted that the output from the reference oscillator 412 is equipped with a variable phase delay 508. Although the phase signals generated by the reference oscillator 412 can be changed by controlling the voltage being sent to it by the CPU 409, this method of phase change is relatively slow. The addition of the variable phase delay 508 feature to the reference oscillator 412 enables minute changes in the phase of signals generated by the reference oscillator 412 to be made almost instantaneously.

Figure 5:
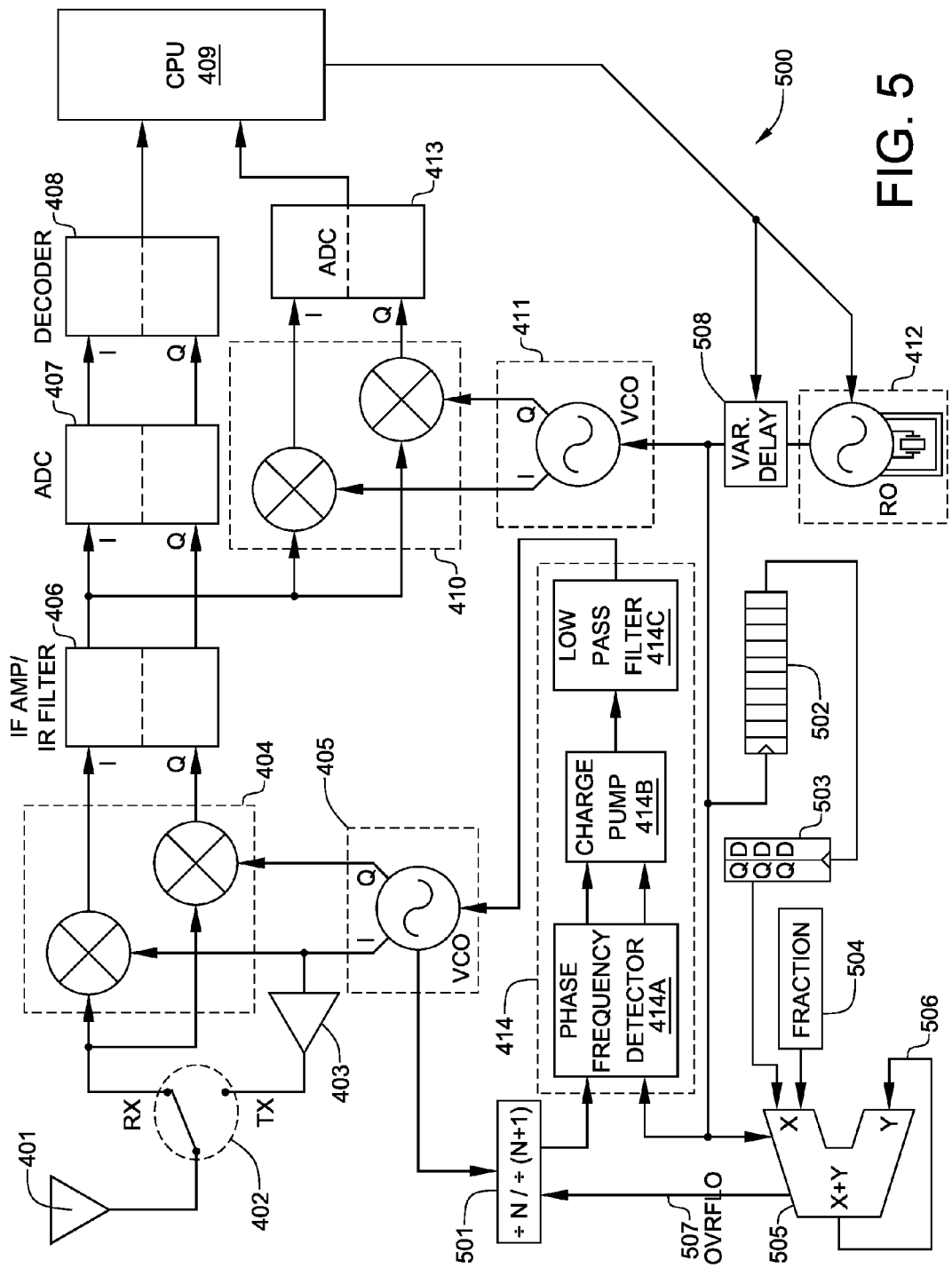
FIG. 5 is a block diagram block diagram of a second embodiment superheterodyne transceiver in which the phase lock loop is allowed to change frequency only when a latch is actuated by an overflow signal from a phase relationship counter, an event that corresponds to a time when all dithered signals corresponding to channel frequency steps are in phase or when they have a predictable phase relationship.
Figure 6:
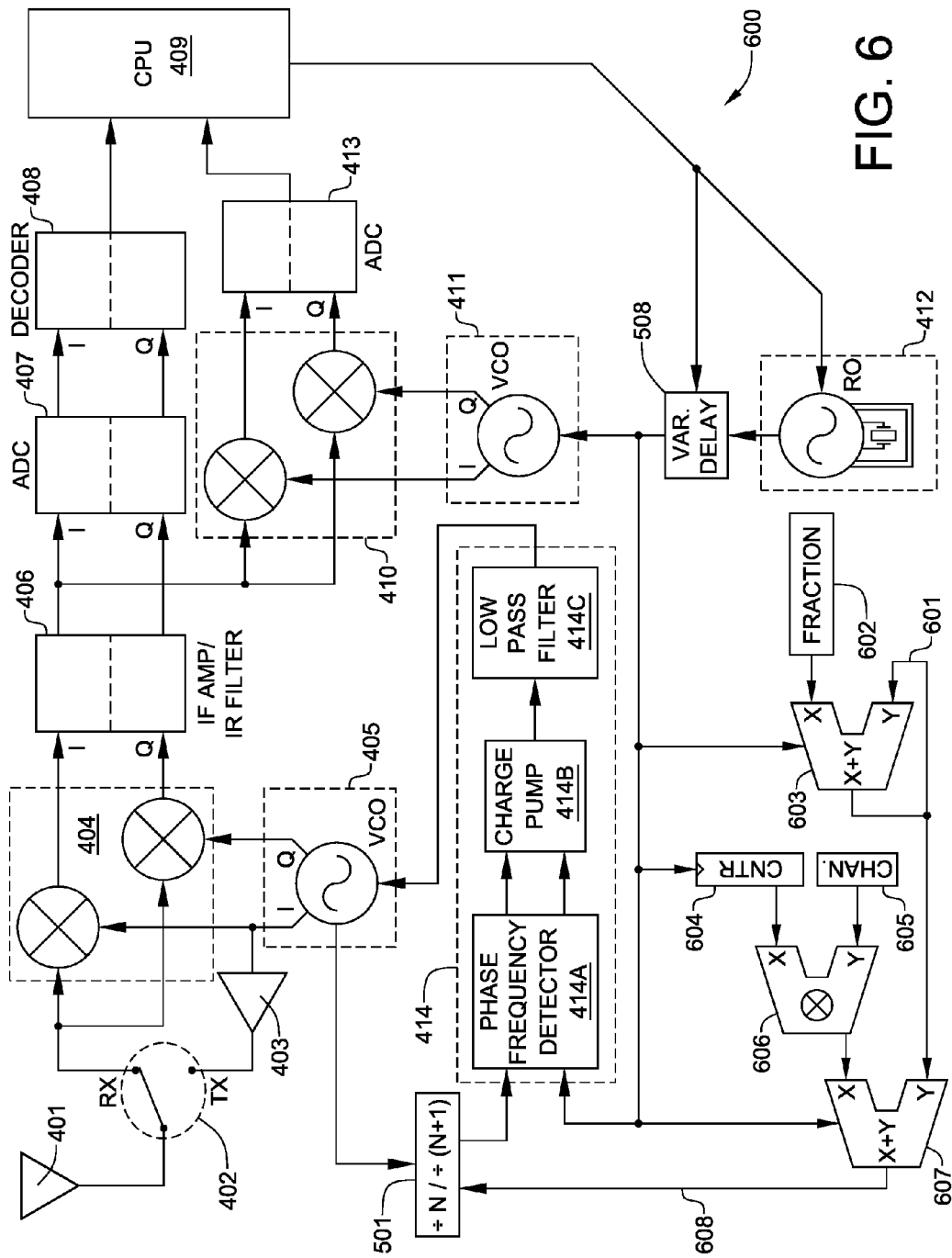
FIG. 6 is a block diagram of a third embodiment superheterodyne transceiver having a phase accumulator of a standard delta-sigma-modulated phase lock loop which keeps track of the phase relationship of the base channel, a multiplier which keeps track of the phase angle offset between a selected channel and the base channel, and an adder which sums the output of the phase accumulator and the multiplier to give the phase angle of the selected channel.

Referring now to FIG. 6, a third embodiment superheterodyne transceiver 600 also employs a dithered divide prescaler 501 for implementing a standard delta-sigma-modulated phase lock loop block 414. As with the second embodiment transceiver 500 of FIG. 5, the phase lock loop block 414 includes a phase frequency detector 414A, a charge pump 414B, and a low pass filter 414C, and the output from the phase lock loop block 414 is received by the primary voltage-controlled oscillator 405. The differences between the transceiver 600 and the transceiver 500 of FIG. 5 is that a phase accumulator 603 is employed to keep track of the phase relationship between the base channel (channel 0) and the reference oscillator 412, a digital multiplier 606 is employed to keep track of the phase angle offset between a selected channel and the base channel, and an adder 607 is employed to sum the output of the phase accumulator 603 and the multiplier 606 to provide an output that represents the phase angle of the selected channel. This output from the adder 607 is provided to the prescaler 501, which then provided an appropriate dithered divide value so that the two inputs to the phase frequency detector 414A can be compared. As with the second embodiment, the length of the period between conditions of alignment is determined by a fractional value 602 that is input as the X value for the X+Y accumulator 603. A sum of X and Y values is provided as a recurring Y input to accumulator 603 via an accumulate path 601 on each cycle of the reference oscillator 412. The accumulated Y value is also input to the Y value of the adder 607. It will be noted that the multiplier 606 receives an X input from a phase relationship counter 604, and a Y input (0 to n) from a channel selector 605. The output from multiplier 606 provides the X input for adder 607. The principle advantage of this third embodiment superheterodyne transceiver 600 is that channel switching can be accomplished much more rapidly, and without waiting for the phase relationships of all channels to align or reach a predictable phase relationship. The additional adder 607 and the digital multiplier 606, in particular, do add additional complexity and power consumption to the circuitry. Like the second embodiment transceiver 500, the third embodiment transceiver 600 can be equipped with a variable phase delay 508 at the output of the reference oscillator 412, which enables minute changes in the phase of signals generated by the reference oscillator 412 to be made almost instantaneously.

Figure 7:
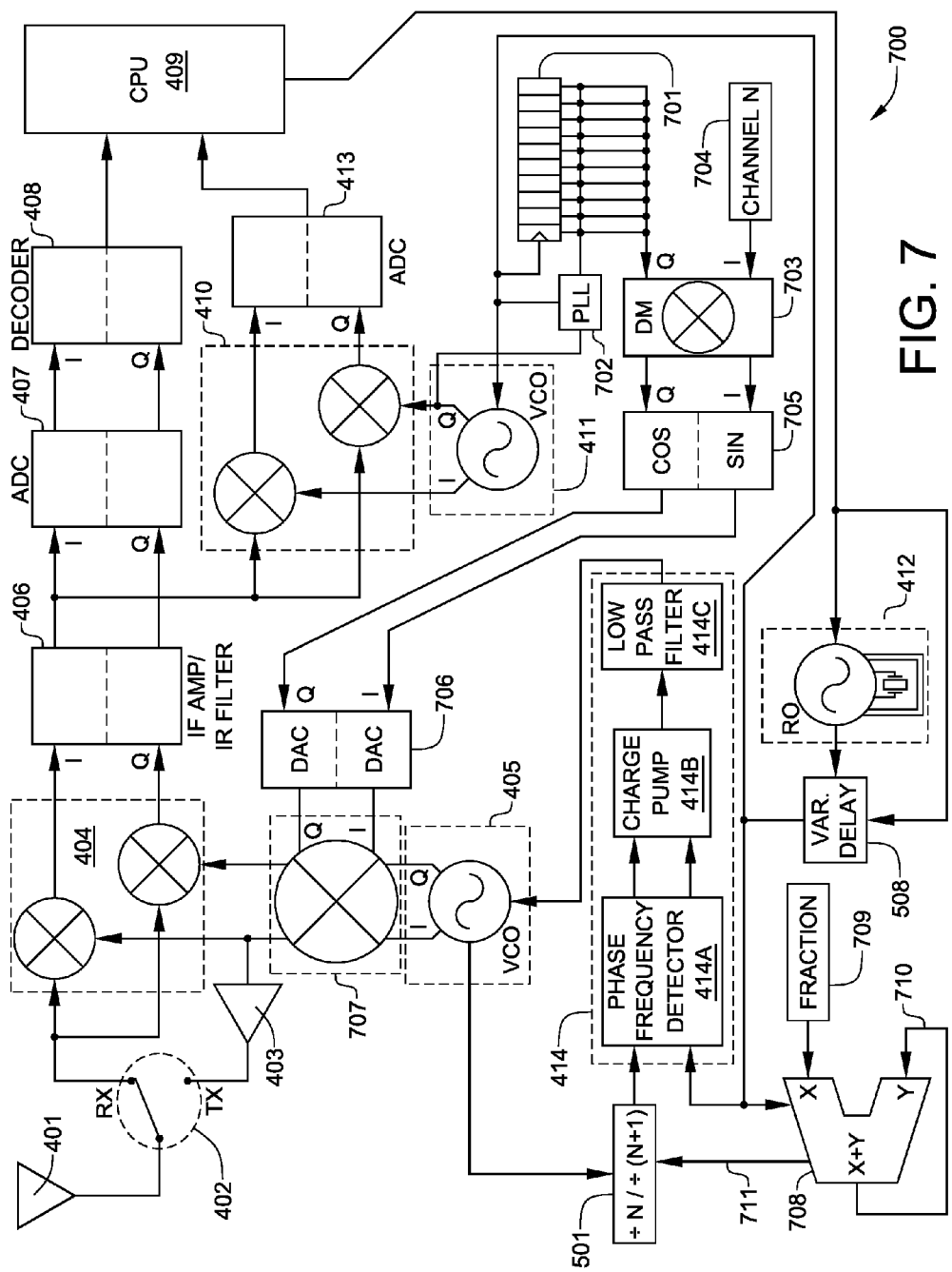
FIG. 7 is a block diagram of another embodiment of a superheterodyne.

Referring now to FIG. 7, a fourth embodiment superheterodyne transceiver 700 also employs a dithered divide prescaler 501 for implementing a standard delta-sigma-modulated phase lock loop block 414. As with the second embodiment transceiver 500 of FIG. 5, the phase lock loop block 414 includes a phase frequency detector 414A, a charge pump 414B, and a low pass filter 414C, and the output from the phase lock loop block 414 is received by the primary voltage-controlled oscillator 405. The fourth embodiment transceiver 700 is designed to provide even faster channel switching, but at the expense of increased system complexity and increased power consumption. A phase accumulator 708 of a standard delta-sigma-modulated phase lock loop keeps track of the phase relationship of a base channel 0 with respect to the reference oscillator 412. A digital multiplier 703 (which is essentially a numerically-controlled oscillator), having inputs from a channel selector with values 0 through n, and a phase relationship counter, which keeps track of each cycle of the reference oscillator 412 through a count which includes all possible phase offset combinations for channels 0 through n in a given bandwidth, provides an quadrature output representative of the phase offset from base channel 0 for a selected channel to cos/sin table lookup module 705. The cos/sin table lookup module 705 provides a quadrature output to a digital to analog converter 706, which in turn provides an analog quadrature output to an image reject premixer 707. The image reject premixer 707 also receives a quadrature input from the primary voltage-controlled oscillator 405 that represents the frequency offset of the base channel. The premixer 707 functions to raise or lower the frequency of the base channel to a value which corresponds to each of the channels 0 through n in the given bandwidth. The adjusted frequency is provided as an input to a standard front-end image rejection mixer stage 404.

The radio transceivers used to implement the present invention employ quadrature phase modulation (QPM). Like all modulation schemes, QPM conveys data by changing some aspect of a carrier signal, or the carrier wave, (usually a sinusoid) in response to a data signal. In the case of QPM, the phase of the carrier is modulated to represent the data signal. Although the invention can be implemented by calculating the phase shift of incoming data packets, it can also be implemented by demodulating the phase-shift of the QPM data packets and using the resulting data to calculate range. Thus, by monitoring the data decoded by block 408 it is possible to use the phase shift data of the incoming QPM signal to normalize the phase from block 410 and allow phase information to be demodulated and used for ranging in normal data packets.

Although only a single embodiment of the invention has been disclosed herein, it will be obvious to those having ordinary skill in the art of ranging equipment design that changes and modifications may be made thereto without departing from the scope of the invention as hereinafter claimed. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A ranging system for determining a ranging measurement, the ranging system comprising:
   a first unit that transmits at least one signal on at least one carrier asking for the ranging measurement, the at least one signal including at least one read range data packet;
   a second unit that receives the at least one signal, wherein the second unit achieves commonality of three frequencies and phase coherence with the at least one signal, the second unit including:
      a first oscillator used in receiving the at least one signal and transmitting at least one second signal back to the second unit;
      a reference oscillator that controls the first oscillator, wherein the at least one read range data packet is used to achieve the commonality of three frequencies and phase coherence in the reference oscillator; and
      a phase coherency counter, wherein the phase coherency counter enables the second unit to transmit the at least one second signal back to the first unit with a predictable phase; and
   wherein the first unit receives the at least one second signal and determines the ranging measurement between the first unit and the second unit.

2. The ranging system of claim 1, wherein the first unit comprises:
   a first oscillator used in transmitting the at least one signal and receiving the at least one second signal;
   a reference oscillator that provides three frequencies and phase for the ranging measurement; and
   a phase coherency counter to switch the first unit between transmit and receive with a predictable phase, wherein the phase coherency counter provides phase information relationships of the first oscillator of the first unit.

3. The ranging system of claim 1, wherein the phase coherency counter of the second unit provides phase information relationships of all frequencies of the first oscillator.

4. The ranging system of claim 3, wherein the phase coherency counter comprises:
   a single phase lock loop that combines input from a phase relationship counter and a frequency setting of the first oscillator to generate the predictable phase in the first oscillator.

5. The ranging system of claim 4, wherein the first unit measures a phase difference of the at least one second signal from the predictable phase in determining the ranging measurement.

6. The ranging system of claim 1, wherein the reference oscillator comprises a thermally-insulated reference oscillator.

7. The ranging system of claim 1, wherein each signal included in the at least one signal are transmitted at different times.

8. The ranging system of claim 7, wherein the at least one signal includes a first signal at a first frequency, a second signal at a second frequency, and a third signal at a third frequency to initially determine the ranging measurement, wherein at least one of the first unit and the second unit hops between the first, second, and third frequency to determine an absolute distance between the first unit and the second unit.

9. The ranging system of claim 8, wherein the first unit uses phase relationships among the first, second, and third signal to identify a multi-path data, wherein the first unit eliminates the multi-path data using at least one signal at a different frequency.

10. The ranging system of claim 8, wherein the first, second, and third frequencies are selected to avoid ambiguous ranging measurements.

11. The ranging system of claim 1, wherein the predictable phase identifies a phase relationship at the second unit between the at least one signal received by the second unit and the at least one second signal transmitted by the second unit.

12. The ranging system of claim 11, wherein the at least one signal transmitted by the first unit and the at least one second signal transmitted by the second unit have one of: the same frequencies, different frequencies, or some of the same frequencies.

13. The ranging system of claim 11, wherein at least some of the at least one signal and the at least one second signal can be transmitted at random times.

14. A method for determining a ranging measurement, the method comprising:
   transmitting at least one signal from a first unit to a second unit, the at least one signal including read range data packets;
   extracting three frequencies and phase information of the at least one signal from the read range data packets;
   setting a reference oscillator to match the three frequencies and phase information of the at least one signal;
   generating at least one second signal having a predictable phase using the reference oscillator;
   transmitting the at least one second signal back to the first unit from the second unit; and
   determining the ranging measurement between the first unit and the second unit by a difference between the predictable phase of the at least one second signal at the second unit and a measured phase of the at least one second signal at the first unit.

15. The method of claim 14, wherein transmitting at least one signal further comprises transmitting a first signal at a first frequency, a second signal at a second frequency, and a third signal at a third frequency, wherein the first, second, and third signals are selected to determine an absolute distance of multiple wavelengths.

16. The method of claim 14, wherein multi-path data is identified by transmitting at least three signals at different frequencies, the at least three signals included in the at least one signal.

17. The method of claim 14, wherein extracting frequency and phase information further comprises measuring a phase of the at least one signal.

18. The method of claim 14, wherein setting a reference oscillator further comprises setting the reference oscillator using a processor.

19. The method of claim 14, wherein transmitting at least one signal further comprises hopping between multiple frequencies, wherein each of the at least one signals are transmitted at different times and wherein each of the at least one second signals are transmitted at different times.

20. The method of claim 14, further comprising using the reference oscillator to provide predictable phase relationships between all frequencies of a first oscillator included in the second unit.

\* \* \* \* \*